(12) United States Patent  (10) Patent No.: US 7,466,462 B2
Chen  (45) Date of Patent: Dec. 16, 2008

(54) DOCUMENT RETAINER FOR VERTICALLY ORIENTED IMAGE SCANNING DEVICE

(76) Inventor: Tsung-Yin Chen, No.1-1, R&D Rd., Science-based Industrial Park, Hsinchu (TW)

( * ) Notice: Subject to any disclaimer, the term of this patent is extended or adjusted under 35 U.S.C. 154(b) by 210 days.

(21) Appl. No.: 11/469,323

(22) Filed: Aug. 31, 2006

(65) Prior Publication Data

US 2007/0058217 A1  Mar. 15, 2007

Related U.S. Application Data

(63) Continuation of application No. 09/984,109, filed on Oct. 29, 2001, now abandoned.

(51) Int. Cl.
*H04N 1/04* (2006.01)

(52) U.S. Cl. .................. 358/497; 358/474; 358/471; 399/379; 399/380

(58) Field of Classification Search ............ 358/474, 358/497, 471; 382/312; 399/211, 379, 380; 250/239, 234–236
See application file for complete search history.

(56) References Cited

U.S. PATENT DOCUMENTS

| | | | |
|---|---|---|---|
| 4,415,261 A | 11/1983 | Yukawa et al. | |
| 5,060,019 A | 10/1991 | Fukunaga | |
| 5,548,417 A | 8/1996 | Sekimoto et al. | |
| 5,748,292 A | 5/1998 | Kawasaki et al. | |
| 6,233,064 B1 | 5/2001 | Griffin | |
| 6,311,940 B1 | 11/2001 | Koshimizu | |
| 6,408,161 B1 | 6/2002 | Minowa et al. | |
| 6,408,162 B1 | 6/2002 | Sheng et al. | |
| 6,433,941 B1 | 8/2002 | Onoda | |
| 6,529,295 B1 | 3/2003 | Poulsen et al. | |
| 6,661,539 B1 | 12/2003 | Nee | |
| 7,196,828 B2 * | 3/2007 | Rubner et al. | ............... 358/497 |
| 7,221,488 B2 * | 5/2007 | Khovaylo et al. | ........... 358/497 |

\* cited by examiner

*Primary Examiner*—Cheukfan Lee
(74) *Attorney, Agent, or Firm*—Stolowitz Ford Cowger LLP

(57) ABSTRACT

A vertically oriented image scanning device includes a chassis with a vertically oriented scanning window and a flap cover pivoted to the chassis. A document support flange is formed along a lower edge of the scanning window for aligning a document with respect to the scanning window. A thin metal plate has opposite edges attached to an inner face of the flap cover and forms a convex configuration for elastic deformation and thus applies a force to retain the document against the scanning window. The convex configuration also helps guide the document into position. Alternatively, a resilient pad replaces the thin metal plate for applying a force to the document.

20 Claims, 5 Drawing Sheets

DOCUMENT RETAINER FOR VERTICALLY ORIENTED IMAGE SCANNING DEVICE

RELATED APPLICATION

The present application is a Continuation of U.S. patent application Ser. No. 09/984,109, filed on Oct. 29, 2001 now abandoned, by Tsung-Yin Chen, titled "Document Retainer for Vertically Oriented Image Scanning Device," assigned to the Assignee of the presently claimed subject matter.

BACKGROUND OF THE INVENTION

1. Field of the Invention

The present invention relates to a vertically oriented image scanning device, and in particular to a vertically oriented image scanning device incorporating a document retainer for securely and properly positioning a document on a scanning window of the image scanning device.

2. Description of the Prior Art

Most of the scanners available in the markets are so called "flat-bed" scanner which comprises a chassis laid flat on for example a desk with a horizontal scanning window on which a document to be scanned is positioned. The document can be retained in position on the scanning window by gravity. The flat-bed scanner, however, occupies a great area of the desk surface, causing a great waste of space of limited office space. This is of particular concern in urban areas where office rent is high.

A vertically oriented image scanning device effectively reduces the desk space required for accommodation by providing a stand-up chassis with a vertically arranged scanning window. Although desk space is effectively saved for accommodating a vertically oriented image scanning device, documents to be scanned cannot be properly and securely retained on the scanning window due to the vertical arrangement of the scanning window. A flap cover is commonly seen in both flat-bed scanners and vertically oriented image scanning devices. Such a flap cover, however, cannot help in effectively and precisely positioning the document on the vertical scanning window of a vertically oriented image scanning device. As a consequence, the scanning quality of a vertically oriented image scanning device cannot be effectively improved.

It is thus desired to have a vertically oriented image scanning device comprising a document retainer for effectively and securely positioning a document on a vertical scanning window of the vertically oriented image scanning device.

SUMMARY OF THE INVENTION

An object of the present invention is to provide a vertically oriented image scanning device comprising a document retainer for securely and effectively retaining a document on a vertical scanning window of the vertically oriented image scanning device.

Another object of the present invention is to provide a vertically oriented image scanning device comprising a document guiding and retaining device for guiding and properly positioning a document on a vertical scanning window of the image scanning device.

To achieve the above objects, in accordance with the present invention, a vertically oriented image scanning device comprises a chassis having a vertically arranged scanning window and a flap cover pivoted to the chassis for removably closing the scanning window. A document support flange is formed along a lower edge of the scanning window for aligning a document with respect to the scanning window. A thin metal plate has opposite edges attached to an inner face of the flap cover and forms a convex configuration for elastic deformation and thus applying a force to retain the document against the scanning window. The convex configuration also helps guiding the document to position. Alternatively, a resilient pad replaces the thin metal plate for applying a force to the document. Bow-shaped members are located on opposite sides of the resilient pad for guiding the document to position.

BRIEF DESCRIPTION OF THE DRAWINGS

The above objects and features of the present invention can be better understood by reading the following detailed description of preferred embodiments of the present invention with reference to the attached drawings, in which.

DETAILED DESCRIPTION OF THE PREFERRED EMBODIMENTS

Figure 1:
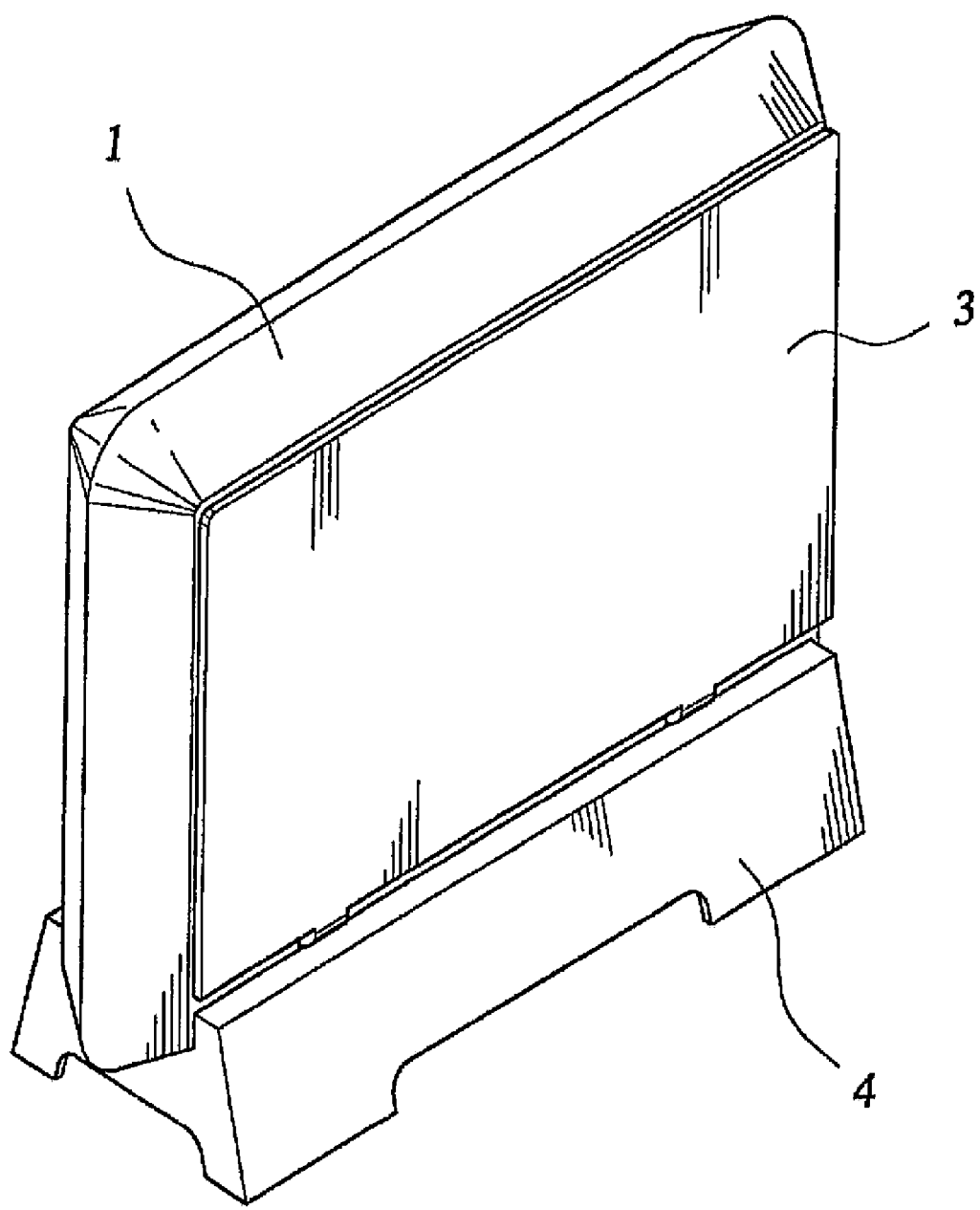
FIG. 1 is a perspective view of a vertically oriented image scanning device in accordance with a first embodiment of the present invention.

With reference to the drawings and in particular to FIGS. 1-4, a vertically oriented image scanning device constructed in accordance with a first embodiment of the present invention comprises a chassis 1 supported by a base 4 which can be placed on for example a desk. The chassis 1 defines an interior space (not labeled) to accommodate electrical and mechanical parts of the image scanning device. Those parts are well known in the art and will not be described herein. The chassis 1 is mounted with a vertically oriented scanning window 2 made of light-transmitting material against which a document 5 to be scanned is positioned. A flap cover 3 is pivotally attached to the chassis 1 for covering the scanning window 2 and retaining the document 5 on the scanning window 2.

Figure 2:
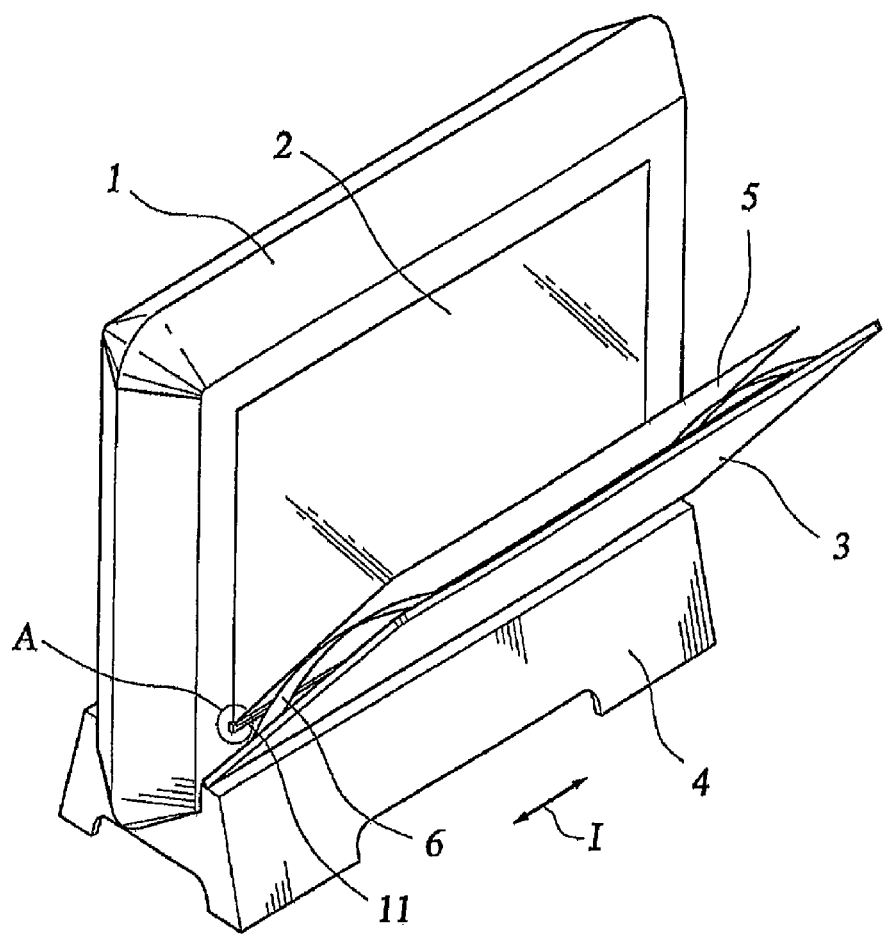
FIG. 2 is similar to FIG. 1 with a flap cover of the scanner opened.
Figure 5:
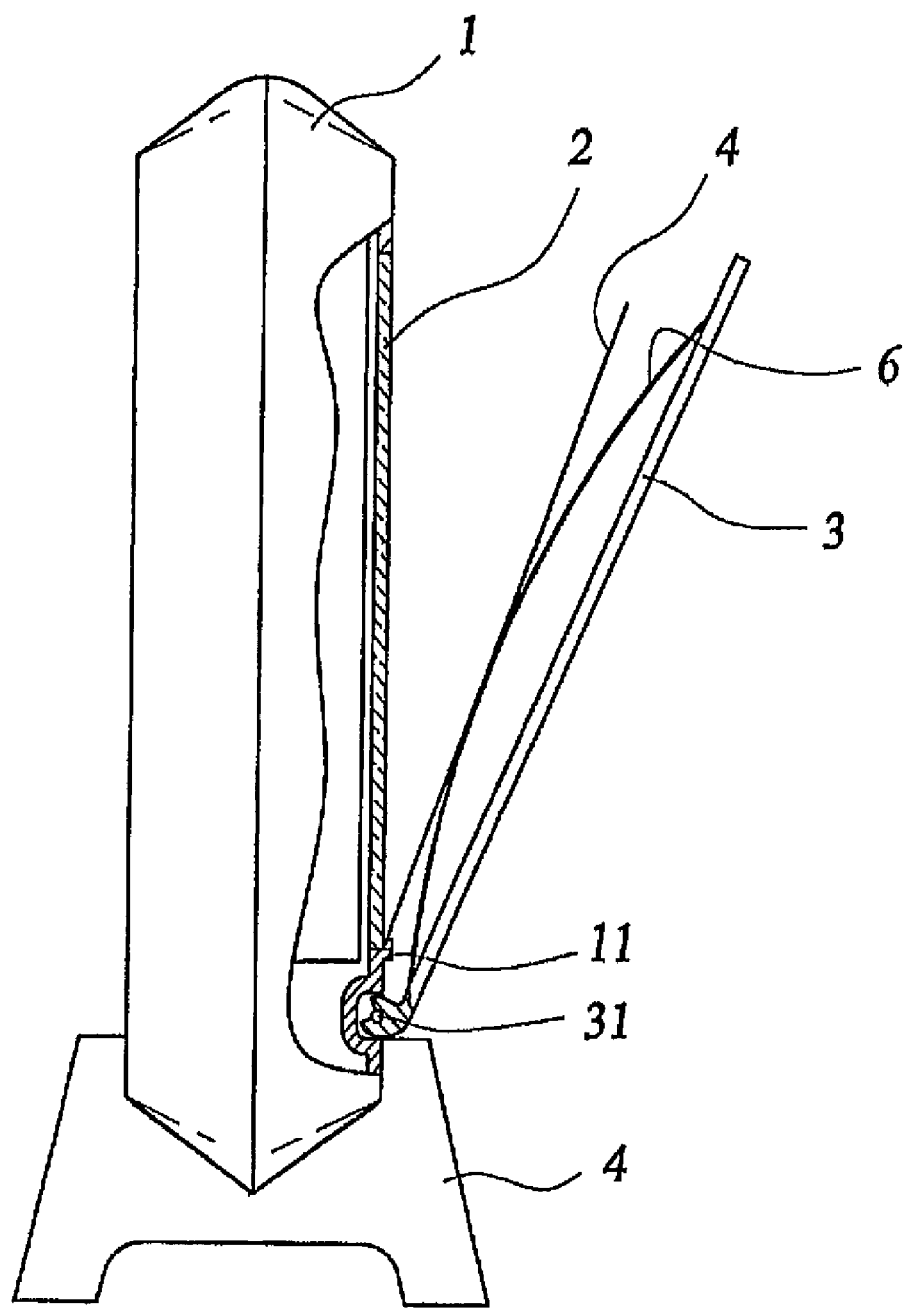
FIG. 5 is a side elevational view of FIG. 2.

Also referring to FIG. 5, a pair of pivots 31 are formed on the chassis 1 to which the flap cover 3 is attached thereby allowing the flap cover 3 to be rotatable with respect to the scanning window 2 about the pivots 31 between an open position as shown in FIG. 2 and a closed position as shown in FIG. 1. In the open position, a document 5 can be inserted between the scanning window 2 and the flap cover 3. In the closed position, the document 5 is firmly retained against the scanning window 2 by the flap cover 3.

Figure 3:
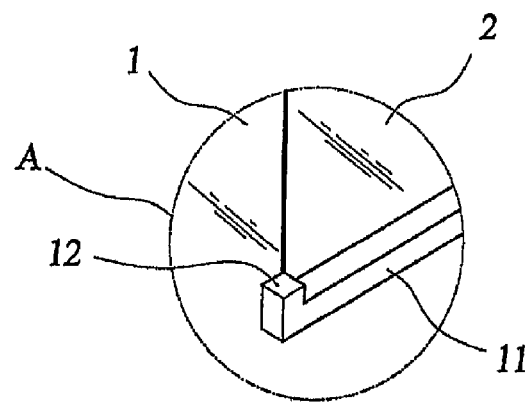
FIG. 3 is an enlarged view of encircled portion A of FIG. 2.
Figure 4:
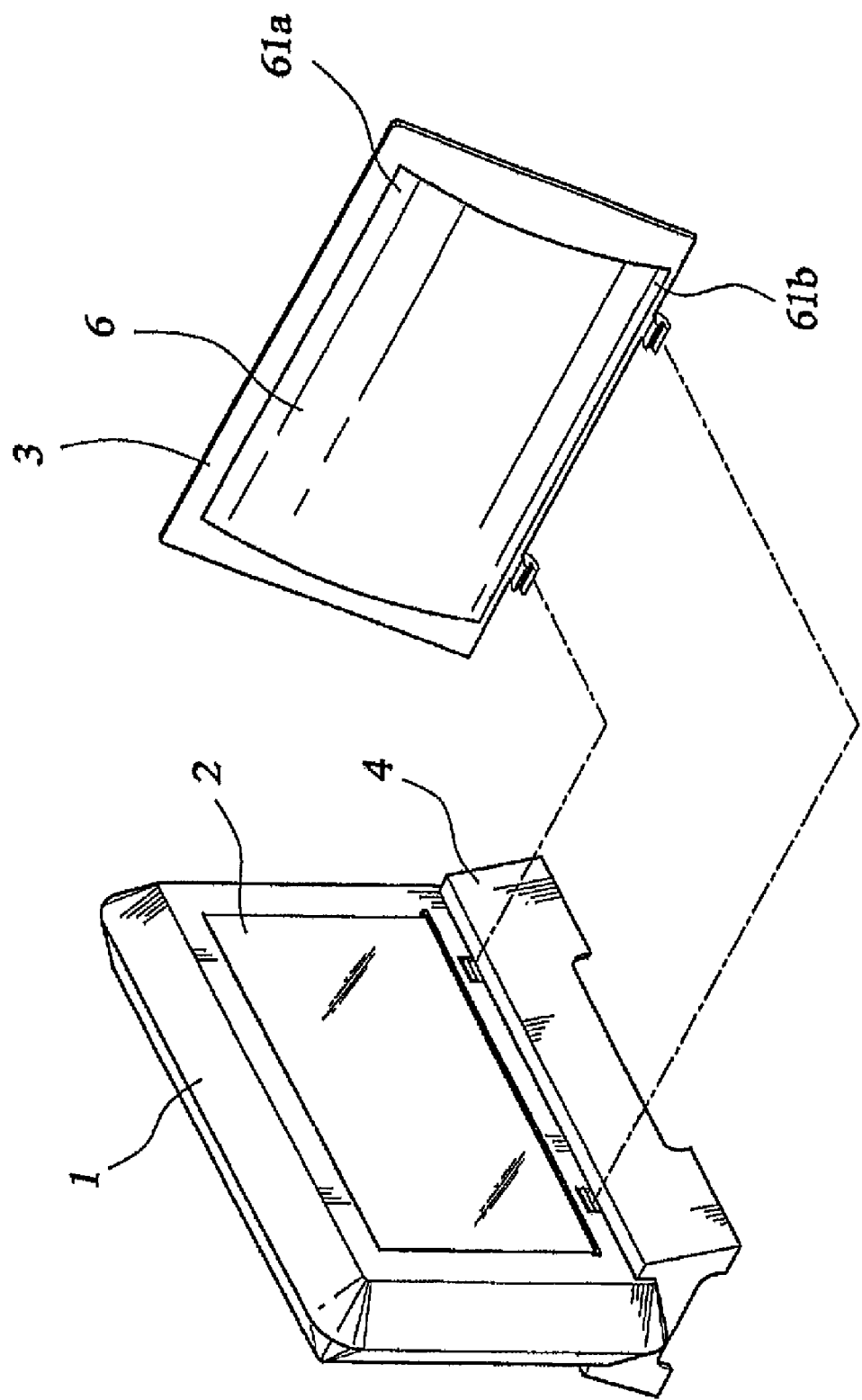
FIG. 4 is similar to FIG. 1 with the flap cover detached from the scanner.

With reference to FIG. 3, it is an enlarged view of encircled portion A of FIG. 2. An elongate rib or flange 11 is formed along a lower edge of the scanning window 2 for supporting and precisely aligning the document 5 with respect to the scanning window 2. Two end projections 12 are formed on opposite ends of the ribs 11 for limiting undesired lateral movement of the document 5 with respect to the scanning window 2.

A document retainer 6 is provided on the inner face of the flap cover 3. The document retainer 6 is made of a resilient material with a bow-shaped cross section having an arched central portion formed between opposite edges 61a. 61b. The edges 61a, 1b are attached to the inner face of the flap cover 3 whereby the arched central portion helps guide the document 5 to desired position. When the flap cover 3 is moved to the closed position, the arched central portion of the document retainer 6 contacts and pushes the document 5 against the scanning window 2. The resiliency of the document retainer 6 allows it to elastically deform and thus apply a force to securely retain document 5 against the scanning window 2.

The document retainer 6 can be made of any resilient material. In the embodiment illustrated, the document retainer 6 comprises a thin sheet of elastic material, such as thin metal plates or sheets of synthetic materials. The thin sheet of elastic material serve as guiding means and retaining means for the document to be scanned. It is apparent to those skilled in the art to devise separate guiding and retaining means and a second embodiment of the present invention directing to such a modification is shown in FIG. 6.

Figure 6:
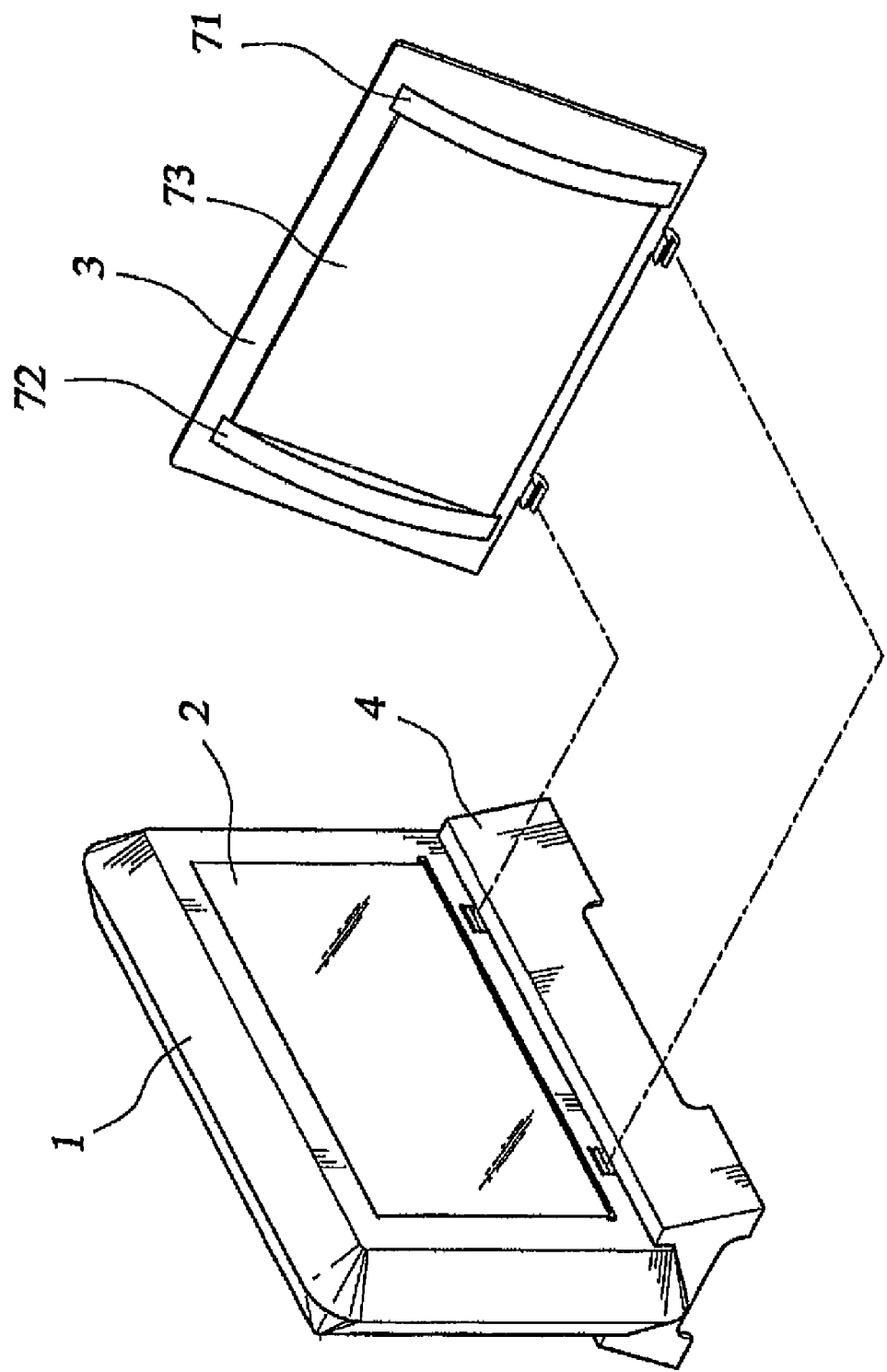
FIG. 6 is similar to FIG. 2 but showing a second embodiment of the vertically oriented image scanning device in accordance with the present invention.

Referring to FIG. 6, wherein the same reference numerals are employed to designate similar parts of the vertically oriented image scanning device shown with reference to FIGS. 1-5, the document retainer comprises a resilient pad 73 mounted to the inner face of the flap cover 3 at a position substantially corresponding to the scanning window 2 whereby when the flap cover 3 is closed, the document 5 is forced against the scanning window 2 by the resilient pad 73 and thus securely retained in position. Two bow-shaped resilient strips 71, 72 are attached to the inner face of the flap cover 3 on opposite sides of the resilient pad 73, serving to guide the document 5 into the image scanning device. Metal strips are examples of the guiding strips 71, 72. Alternatively, a mass of resilient material made in convex configuration can also be taken to replace the resilient strips.

Although the present invention has been described with reference to the preferred embodiments thereof, modifications and variations can be made without departing from the spirit and scope of the present invention defined in the appended claims.

The invention claimed is:

1. An image scanning device, comprising:
   a chassis comprising a vertical scanning window;
   a scanner cover movably attached to said chassis and comprising an inner face, wherein said scanner cover is configured to movably cover said vertical scanning window;
   a document retainer attached to said inner face of said scanner cover, wherein said document retainer comprises a resilient member configured to resiliently force said document against said vertical scanning window if said scanner cover is closed;
   a document support flange formed along a lower edge of said vertical scanning window; and
   a pair of projections formed on opposite ends of said document support flange, wherein said document support flange or said pair of projections are configured to substantially align said document with said vertical scanning window.

2. The image scanning device of claim 1, wherein said resilient member comprises a metal sheet.

3. The image scanning device of claim 1, wherein said chassis is mounted on a base.

4. The image scanning device of claim 1, wherein said resilient member comprises a resilient pad.

5. The image scanning device of claim 4, further comprising:
   document guides, attached to said inner face of said scanner cover on opposite sides of said resilient pad, wherein said document guides comprise a pair of bow-shaped resilient strips each having at least one end attached to said inner face of said scanner cover, and wherein said document guides are configured to align said document.

6. The image scanning device of claim 1, further comprising:
   document guides attached to said inner face of said scanner cover, wherein said document guides comprise a mass of resilient material attached to said inner face of said scanner cover, and wherein said document guides are configured to align said document.

7. An image scanning device, comprising:
   a chassis including a vertical scanning window;
   a flap cover movably attached to the chassis and comprising an inner face, wherein said flap cover is configured to movably close toward said vertical scanning window; and
   a document retainer attached to said inner face of said flap cover, wherein said document retainer comprises a plurality of bow-shaped resilient strips each having at least one end attached to the inner face of said flap cover, and wherein said document retainer is configured to resiliently force said document against said vertical scanning window if said flap cover is closed.

8. The image scanning device of claim 7, further comprising:
   a document support flange formed along a lower edge of said vertical scanning window; and
   a pair of projections formed on opposite ends of said document support flange.

9. The image scanning device of claim 7, wherein said resilient strips comprise a metal sheet.

10. The image scanning device of claim 7, wherein said chassis is mounted on a base.

11. The image scanning device of claim 7, further comprising a pad mounted to said inner face of said flap cover between at least two of said resilient strips.

12. The image scanning device of claim 11, wherein said pad is made of a resilient metal.

13. An image scanning device, comprising:
   a chassis comprising a vertical scanning window;
   a scanner cover movably attached to said chassis and comprising an inner face, wherein said scanner cover is configured to movably cover said vertical scanning window; and
   a document retainer attached to said inner face of said scanner cover, wherein said document retainer is configured to resiliently force said document against said vertical scanning window if said scanner cover is closed, and wherein said document retainer comprises a plurality of bow-shaped resilient strips.

14. A method of using an image scanning device for scanning a document, comprising:
   placing a document to be scanned between a vertically oriented image scanning window and a movable cover having a plurality of bow-shaped resilient members; and
   forcing said plurality of bow-shaped resilient members to deform by closing said movable cover, wherein said plurality of bow-shaped resilient members are configured to press;
   said document against said image scanning window.

15. The method of claim 14, wherein said plurality of bow-shaped resilient members are further configured to align said document by guiding said document against a document support flange.

16. An image scanning device for scanning a document, comprising:
   a vertical image scanning window;
   a cover for said scanning window;

a bow-shaped document retainer configured to press a document against said image scanning window; and a guide configured to guide a document into alignment relative to said vertical image scanning window, wherein said guide forms a lip below said vertical window and includes upward protrusions configured to horizontally align said document relative to said image scanning window.

17. The image scanning device of claim 16, wherein said bow-shaped document retainer comprises a pair of bow-shaped resilient strips each having at least one end attached to an inner face of said cover, and wherein said bow-shaped document retainer aligns said document to said guide.

18. An apparatus, comprising:

means for supporting an image scanning window in a vertical orientation;

means for moveably covering said image scanning window; and means for holding a document against said image scanning window using a plurality of bow-shaped resilient members, wherein said document is pushed against said image scanning window when said means for covering said image scanning window is closed.

19. The apparatus of claim 18, wherein said document is guided into alignment relative to said image scanning window when said means for moveably covering said image scanning window is closed.

20. The apparatus of claim 19, wherein said document is guided against a document support flange formed along a lower edge of the image scanning window, and wherein said document support flange comprises a pair of projections formed on opposite ends of said document support flange.

* * * * *

UNITED STATES PATENT AND TRADEMARK OFFICE
CERTIFICATE OF CORRECTION

| | | |
|---|---|---|
| PATENT NO. | : 7,466,462 B2 | Page 1 of 1 |
| APPLICATION NO. | : 11/469323 | |
| DATED | : December 16, 2008 | |
| INVENTOR(S) | : Tsung-Yin Chen | |

It is certified that error appears in the above-identified patent and that said Letters Patent is hereby corrected as shown below:

At column 3, line 64, delete "guides," and insert -- guides --, therefor.

At column 4, line 58, delete "press;" and insert -- press --, therefor.

Signed and Sealed this

First Day of September, 2009

David J. Kappos
*Director of the United States Patent and Trademark Office*